(12) United States Patent
Werling et al.

(10) Patent No.: US 9,371,089 B2
(45) Date of Patent: Jun. 21, 2016

(54) DRIVER ASSISTANCE SYSTEM OF A NON-TRACK-BOUND VEHICLE

(71) Applicant: Bayerische Motoren Werke Aktiengesellschaft, Munich (DE)

(72) Inventors: Moritz Werling, Munich (DE); Philipp Reinisch, Munich (DE); Klaus Gresser, Dachau (DE); Peter Zahn, Herrsching am Ammersee (DE); Nils Pletschen, Munich (DE)

(73) Assignee: Bayerische Motoren Werke Aktiengesellschat, Munich (DE)

( * ) Notice: Subject to any disclaimer, the term of this patent is extended or adjusted under 35 U.S.C. 154(b) by 154 days.

(21) Appl. No.: 14/185,456

(22) Filed: Feb. 20, 2014

(65) Prior Publication Data

US 2014/0172235 A1   Jun. 19, 2014

Related U.S. Application Data

(63) Continuation of application No. PCT/EP2012/063508, filed on Jul. 10, 2012.

(30) Foreign Application Priority Data

Aug. 22, 2011  (DE) .......................... 10 2011 081 320
Aug. 22, 2011  (DE) .......................... 10 2011 081 321

(51) Int. Cl.
*B62D 6/00* (2006.01)
*B62D 15/02* (2006.01)
(Continued)

(52) U.S. Cl.
CPC ............... *B62D 6/002* (2013.01); *B60W 10/18* (2013.01); *B60W 10/20* (2013.01); *B60W 30/12* (2013.01); *B60W 50/16* (2013.01); *B62D 15/025* (2013.01)

(58) Field of Classification Search
None
See application file for complete search history.

(56) References Cited

U.S. PATENT DOCUMENTS 5,168,948 A * 12/1992 Rohringer ............ B62D 7/1518
                                                    180/414
6,559,612 B2   5/2003 Baumgarten
(Continued)

FOREIGN PATENT DOCUMENTS

DE   100 45 385 A1   3/2002
DE   103 03 870 A1   8/2004
(Continued)

OTHER PUBLICATIONS

Hofbauer, Manfred; Translation of DE 10306100, Sep. 16, 2004.*
(Continued)

*Primary Examiner* — Rami Khatib
*Assistant Examiner* — David Merlino
(74) *Attorney, Agent, or Firm* — Crowell & Moring LLP

(57) ABSTRACT

A driver assistance system and method of operating same is provided for a non-track-bound. By applying a steering torque to the driver's steering wheel via an electric motor, a direction-oriented steering recommendation is made to the driver. By this steering torque, first, a steering wheel angle in the recommended rotating direction at an angular speed that is greater in its amount is set and subsequently a steering wheel angle is set in the opposite rotating direction at an angular speed that is lower in its amount. Subsequent to the setting of the steering wheel angle having the opposite rotating direction, at a comparatively lower angular speed, a further steering wheel angle can be set, by which the vehicle is changed along a straight course of the road essentially to the orientation held before the making of the direction-oriented steering recommendation.

19 Claims, 2 Drawing Sheets

(51) Int. Cl.
*B60W 50/16* (2012.01)
*B60W 10/18* (2012.01)
*B60W 10/20* (2006.01)
*B60W 30/12* (2006.01)

(56) References Cited

U.S. PATENT DOCUMENTS

| | | | | |
|---|---|---|---|---|
| 2002/0059023 | A1* | 5/2002 | Takagi | B60T 8/17554 701/70 |
| 2006/0217861 | A1* | 9/2006 | Ihara | B62D 15/029 701/41 |
| 2009/0187313 | A1 | 7/2009 | Kawakami et al. | |
| 2010/0121532 | A1* | 5/2010 | Urai | B60T 7/22 701/42 |

FOREIGN PATENT DOCUMENTS

| | | | | |
|---|---|---|---|---|
| DE | 103 07 475 | A1 | | 9/2004 |
| DE | 10306100 | A1 * | 9/2004 | B62D 15/029 |
| DE | 10 2006 022 663 | A1 | | 11/2007 |
| DE | 10 2006 041 237 | A1 | | 3/2008 |
| DE | 102007016799 | A1 * | 10/2008 | B62D 5/001 |
| DE | 10 2007 058 078 | A1 | | 6/2009 |
| DE | 10 2009 002 821 | A1 | | 11/2010 |
| EP | 1 884 449 | A1 | | 2/2008 |
| EP | 1 777 143 | B1 | | 11/2009 |
| EP | 2 135 789 | A1 | | 12/2009 |

OTHER PUBLICATIONS

Ehrenpfordt, Ingmar; Translation of DE 102007016799, Oct. 30, 2008.*

German Search Report dated Apr. 20, 2012 with partial English translation (ten (10) pages).

German Search Report dated Apr. 23, 2012 with partial English translation (ten (10) pages).

International Search Report dated Sep. 6, 2012 with English translation (five (5) pages).

* cited by examiner

US 9,371,089 B2

DRIVER ASSISTANCE SYSTEM OF A NON-TRACK-BOUND VEHICLE

CROSS REFERENCE TO RELATED APPLICATIONS

This application is a continuation of PCT International Application No. PCT/EP2012/063508, filed Jul. 10, 2012, which claims priority under 35 U.S.C. §119 from German Patent Application No. 10 2011 081 321.7 and 10 2011 081 320.9, filed Aug. 22, 2011, the entire disclosures of which are herein expressly incorporated by reference.

BACKGROUND AND SUMMARY OF THE INVENTION

The invention relates to a driver assistance system of a non-track-bound vehicle which, by applying a steering torque to the driver's steering wheel, makes a direction-oriented steering recommendation to the driver by way of an electric motor or the like. Concerning the technical environment, reference is made by way of example only to European Patent Document EP 1 777 143 B1.

Such a known driver assistance system can make a haptic steering recommendation to the driver by way of the steering wheel in certain driving situations, for example, when driving on the autobahn, in the case of a passing maneuver necessary for maintaining a driving speed predefined by the driver and appropriately controlled by a cruise control system. For this purpose, an appropriately activated motor (servomotor) applies a directed steering torque of a suitable amount to the driver's steering wheel, which has the purpose of leading to a change of the steering wheel angle set so far, and finally of initiating a passing operation controlled by the driver by use of his steering wheel. The amount of steering torque applied by the above-mentioned motor or by the driver assistance system is usually selected such that the driver will always be able to oversteer this steering torque and thereby overrule the system default. The action upon the steering wheel by such a steering torque representing the steering recommendation can take place in different fashions, thus, for example, in the form of a rectangular pulse of a predefined pulse height and time period or in the form of an at first linearly rising, then briefly constant, and subsequently linearly falling steering torque, or also by way of a steering torque function that is non-linear with respect to time. All these and similar forms are to be considered as falling within the scope of a torque applied in the sense of a "direction-oriented steering recommendation."

When the amount, i.e. the extent, and the time period of the steering torque representing a steering recommendation is selected such that the driver sufficiently notices this haptic signal, the driver, if he sufficiently firmly holds his steering wheel with his hands, will considerably dampen the brief steering impulse of the vehicle resulting from this steering torque, so that solely as a result of the assistance system almost no deviation of the vehicle from the original course will take place. However, if the driver holds the steering wheel only slightly, for example, only with one hand, or the driver has even completely removed his hands from the steering wheel (hands off), the steering impulse that is applied by the driver assistance system and is hardly damped, despite the relatively short time period, leads to a considerable deviation of the vehicle orientation from the original driving trajectory. If, in such a case, the driver does not want to comply with the recommendation of the driver assistance system, thus, for example, because the neighboring driving lane, into which a change is recommended by the driver assistance system, at least in the driver's estimation, is not sufficiently vacant, at least the driver's reaction time will go by before the latter can correct this unwanted course.

It is an object of the present invention to provide a remedial measure for the above-described problems.

For a driver assistance system of a non-track-bound vehicle which, by applying a steering torque to the driver's steering wheel by way of an electric motor or the like, makes a direction-oriented steering recommendation to the driver, the solution of this object is characterized in that, by means of this steering torque, first a steering wheel angle in the recommended rotating direction at an angular speed that is greater in its amount is set or at least is to be set and that subsequently a steering wheel angle is set or at least is to be set in the opposite rotating direction at an angular speed that is lower in its amount.

First, it should be pointed out that a driver assistance system and, therefore, an electronic control unit is described herein, by which the described process is carried out or can be carried out. The process applies a steering torque to the driver's steering wheel of a non-track-bound vehicle by use of an electric motor or the like. In this case, by way of this steering torque, a direction-oriented steering recommendation is made to the driver. Such an electronic control unit for a driver assistance system includes a processor and appropriately programmed memory to carry out its functions.

In accordance with the present invention, in view of the fact that, on the one hand, a reliable awareness of the steering recommendation by the driver is to be ensured even if the latter is holding the steering wheel tight, and simultaneously in the event that the driver is not or is barely holding the steering wheel, no excessive deviation of the orientation of the vehicle from its original driving trajectory should take place, a quasi-automatic countersteering (with an opposite rotating direction) is provided with respect to the precedingly given steering recommendation (or its rotating direction). This automatic countersteering is preferably initiated by the same motor which also applies the steering torque representing the steering recommendation to the steering wheel, and this countersteering should be noticeable to the driver at the steering wheel as little as possible or should at least be significantly less noticeable than the preceding steering recommendation.

In this sense, it becomes possible to apply to the steering wheel corresponding steering torques differing with respect to their amount noticeable to the driver, or at least its time-dependent courses, thus, different so-called steering torque functions. The above-mentioned steering recommendation can therefore be made by a jerky application of a steering torque to the driver's steering wheel, and subsequent to this steering recommendation (in the form of a steering torque), a steering torque of a lower amount and a correspondingly longer duration, which is directed against this steering torque and at least approximately neutralizes it, can be applied to the steering wheel. In a preferred embodiment, the amount of the integral of the steering torque representing the steering recommendation over its effective period can essentially be identical to the amount of the integral of the at least approximately neutralizing steering torque over its effective period, so that, at least with respect to the steering torque initiated within the scope of the steering recommendation, a complete neutralization will take place; however, the orientation of the vehicle itself is not yet corrected thereby. As stated in detail below, the latter can subsequently also be carried out automatically, preferably proportioned such that this is not interpreted by the driver as a further steering recommendation.

The application of corresponding steering torques or steering torque functions as such is, however, only a special embodiment of the present invention; more generally, the present invention can be described by a suitable activation of the motor (servomotor, electric motor) representing these steering torque functions in that certain steering angles, here called steering wheel angles, are set or at least are to be set at the driver's steering wheel, at different setting speeds, i.e. different angular speeds (as a mathematical derivation of the steering wheel angle over the time). The latter, specifically the desired setting of a steering wheel angle, applies to a case in which the driver holds his steering wheel so tight that, by means of sensibly dimensioned servomotors, no steering torque can be applied that is so high that a corresponding steering wheel angle can actually be set. Independently of the force by which the driver holds his steering wheel, however, a change (even if only a slight change) of the steering angle at an angular speed greater in its amount is haptically noticeable in a best-possible manner to the driver and is particularly significantly more noticeable than a (preferably even slight) change of the steering wheel angle at an angular speed that is lower in its amount.

If the driver is holding his steering wheel with an extremely low force or if he is not at all holding onto the steering wheel, a steering recommendation in the form of a change of the steering wheel angle taking place at an angular speed greater in its amount can also be visually perceived in a best-possible manner by way of the steering wheel movement or by means of a change of the orientation of the vehicle. However, even if the driver is tightly holding on to his steering wheel, a change according to the invention of the steering wheel angle at a greater angular speed is at least haptically clearly noticeable to the driver because, with a correspondingly high steering torque for the representation of this angular speed, at least a slight and therefore noticeable change of the steering wheel angle will occur. In contrast, the subsequent change of the steering wheel angle according to the invention at a considerably lower angular speed in the rotating direction opposite the previously made steering recommendation, irrespective of how tightly the driver is holding his steering wheel, is hardly noticed by the driver, specifically neither haptically nor visually.

The above explanation also indicates a particular advantage of the process according to the invention, which is carried out by a driver assistance system according to the invention. Specifically, this process can be implemented in an automatically self-controlling fashion, with the force applied to the steering wheel by the driver being the disturbance variable. When this force is very low, the steering torque applied to the steering wheel by the above-mentioned motor or the corresponding time-related steering torque function may be of a low amount, whereas, when the driver is holding his steering wheel in a very strong manner, a corresponding steering torque function of a higher amount of the maximal steering torque can be applied to the steering wheel in an automatically controlled fashion.

In that, as basically suggested, when implementing the process according to the invention, the driver assistance system rotates the steering wheel, at first at a higher angular speed and therefore clearly noticeably to the driver, about a certain, although possibly only small angle into the direction coinciding with the steering recommendation and subsequently rotates the steering wheel at a lower angular speed and therefore at least less noticeably and preferably virtually not noticeably to the driver, back into the opposite direction, the effect of such a steering recommendation on the orientation of the vehicle (more precisely, of its longitudinal axis) will be less than in the state of art, in which only the steering recommendation is made but no subsequent automatic steering in the opposite rotating direction takes place. In this case, the steering wheel angle set at the lower angular speed and thereby at least less noticeably to the driver (in the opposite rotating direction) with respect to its amount, may be essentially equal to the steering wheel angle precedingly set at the greater angular speed and thereby more acutely noticeably to the driver. After the complete implementation of such a steering recommendation, the steering wheel will at any rate advantageously be situated back in its original angle position.

In accordance with an advantageous further development, it may be provided that, subsequent to the setting of the steering wheel angle having the opposite rotating direction, preferably also at a lower angular speed, a further steering wheel angle or at least a further steering angle acting upon the steerable wheels is set automatically, i.e. by the driver assistance system according to the invention, by which the vehicle is changed along a straight course of the road at least to the orientation held before the making of the direction-oriented steering recommendation. Not only the steering angle introduced into the steering system of the vehicle by the steering recommendation is quasi neutralized thereby but the steering impulse introduced into the steering system of the vehicle with this steering recommendation, with respect to the vehicle orientation, is advantageously automatically canceled, so that this steering recommendation only has the effect of a slight lateral offset of the vehicle with respect to the condition before this steering recommendation. This automatic targeted orientation of the vehicle preferably also takes place in a manner proportioned such that it is hardly or at least considerably less noticed than the steering recommendation previously generated at the steering wheel and applied to it in the form of a torque.

A driver assistance system according to the invention can interact particularly advantageously with a vehicle steering system, which is equipped with a superimposed system by which a further additional steering angle effective at the steerable wheels can be added to the steering angle predefined by the driver at the steering wheel, (compare in this respect, for example, DE 103 07 475 A1), whereby the gear ratio between the steering wheel and the steerable wheels can be changed. For a further improvement of the process according to the invention by way of such a superimposed system, when a direction-oriented steering recommendation is made by way of the steering wheel and during the subsequent automatic setting of a steering wheel angle in the opposite rotating direction, the superimposed system can in each case set an additional steering angle directed against the set steering wheel angle, so that the effect of the steering wheel rotating angle represented as a steering recommendation as well as of the subsequent slower rotating-back of the steering wheel according to the invention at the steerable wheels is reduced. As an alternative or in addition, for the further suggested orientation of the vehicle along a straight course of the road at least approximately into the orientation held before the making of the steering recommendation, an additional steering angle also suitable for this purpose can be set in the superimposed system.

A driver assistance system according to the invention can advantageously interact with a vehicle steering system, in which, in addition to the front wheels, which are steerable by way of the steering wheel, the rear wheels of the vehicle are at least also slightly steerable. Thus, when making a direction-oriented steering recommendation by way of the steering wheel and subsequently automatically setting a steering wheel angle in the opposite rotating direction, a steering angle at the rear wheels of the vehicles in the same direction can in each case be set, whereby the yaw movement of the vehicle is reduced and the vehicle is essentially offset slightly laterally, but essentially retains its original orientation (along a straight course of the road). Should the latter not be fully accomplished, as an alternative or in addition, for the further suggested orientation of the vehicle along a straight course of the road, at least approximately into the orientation held before the making of the steering recommendation, a steering angle suitable for this purpose can also be set at the steerable rear wheels of the vehicle.

A driver assistance system according to the invention can advantageously interact with a vehicle braking system, by which, independently of the steering system, a yaw moment can be impressed on the vehicle by one-sided braking, as occurs in the state of the art relating to the current electronic stabilization programs (ESP, DSC or electronic stability control). By interacting with such a system, when a direction-oriented steering recommendation is made by way of the steering wheel and, during the subsequent automatic setting of a steering wheel angle by one-sided braking, a yaw moment can be generated that is directed against the respective steering wheel angle, whereby the yawing movement of the vehicle is reduced and the vehicle is essentially slightly laterally offset but essentially retains its original orientation (along a straight course of the road). Should the latter not be completely accomplished, as an alternative or in addition, for the further suggested orientation of the vehicle along a straight course of the road, at least approximately into the orientation held before the making of the steering recommendation, a yaw moment suitable for this purpose can be also generated by one-sided braking.

It was mentioned above that, in the case of a driver assistance system according to the invention, the electric motor or servomotor applying the corresponding steering torque or torques for setting the abovementioned steering wheel angles to the steering wheel can be subjected to an automatic control by use of a closed automatic control circuit with respect to the steering torque function to be applied. In this case, the automatic control can be carried out with respect to certain steering wheel angles to be set at a different angular speed and with a different rotating direction. As an alternative, the respective angular speed, at which the steering wheel is rotated at least minimally, as a function of the present marginal conditions, particularly as a function of the force with which the driver is holding the steering wheel, can be automatically controlled to certain predefined values. However, as an alternative, a control (pre-control) may also be provided such that certain time-related steering torque functions are provided for the abovementioned electric motor/servomotor, during whose implementation, for the making of a direction-oriented steering recommendation, first a steering-wheel angle is set in the recommended rotating direction at an angular speed whose amount is greater, and subsequently a steering-wheel angle is set in the opposite rotating direction at an angular speed whose amount is lower.

In the case of a driver assistance system according to the invention, when the electric motor or servomotor is applying the corresponding torque or torques to the steering wheel, possible friction effects in the pertaining steering system of the vehicle are taken into account in a suitable manner; i.e. particularly friction losses which reduce the effect noticeable to the driver at his steering wheel can be taken into account when activating the above-mentioned servomotor such that the driver, as desired, can clearly recognize the steering recommendation, whereas the subsequent "countersteering" for the at least partial neutralization of the steering operation acting upon the vehicle from this steering recommendation is virtually not or at least considerably less noticeable or recognizable to the driver.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
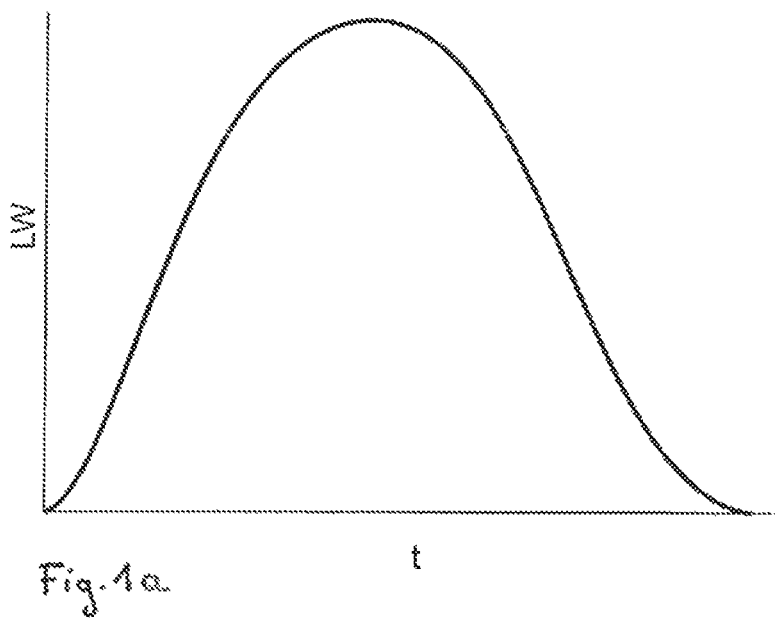
FIG. 1a is a graph illustrating an exemplary steering torque function over time, in which a set steering angle is provided on the ordinate.
Figure 1B:
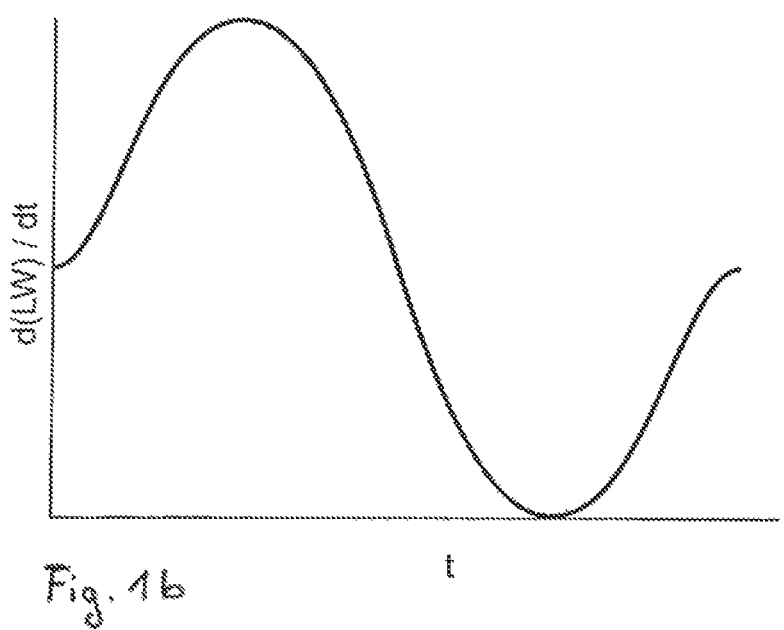
FIG. 1b is a graph illustrating an exemplary steering torque function over time, in which an associated angular speed is provided on the ordinate.

In FIGS. 1a, 1b, an exemplary steering torque function according to the invention is illustrated over the time t on the respective abscissa, in which case the upper diagram (FIG. 1a) shows the set steering angle LW on the ordinate, and the lower diagram (FIG. 1b) shows the pertaining angular speed (d(LW)/dt) on the ordinate.

Figure 2A:
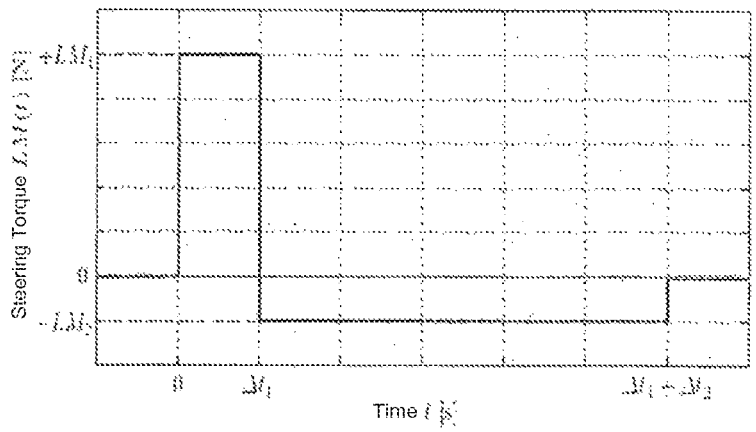
FIGS. 2a and 2b are exemplary illustrated temporal courses of steering torques applied to a steering wheel in accordance with the invention.
Figure 2B:
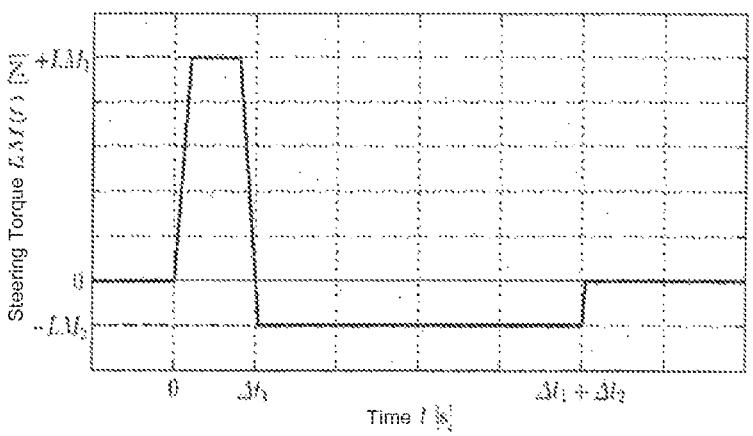

In FIGS. 2a, 2b, two examples of temporal courses of steering torques applied according to the invention will be illustrated using the following designations: LM1 indicates the steering torque showing a steering recommendation which is applied to the steering wheel during a first time period Δt1, and LM2 indicates the countersteering torque which essentially neutralizes this steering torque LM1 and which is applied to the steering wheel during a subsequent second time period Δt2.

In order to, on the one hand, ensure a reliable perception of the steering indication by the driver even when the driver is tightly holding the steering wheel, and in order to simultaneously, when the driver is not or hardly holding the steering wheel, receive no significant rotational end speed of the steering wheel by the jerky application of a steering torque from the driver assistance system, in the embodiment according to FIGS. 2a, 2b, a quasi automatic countertorque with respect to the precedingly made steering recommendation is described which is also applied to the steering wheel by the driver assistance system. However, this countertorque should be noticeable as little as possible or at least significantly less noticeable than the preceding steering recommendation to the driver at the steering wheel, which is why the amount of the countertorque directed against the steering recommendation and quasi-neutralizing the latter is selected to be lower than the amount of the steering torque representing the steering recommendation. Thus, following the actual steering recommendation with a maximal amount of:

|LM1|, an oppositely directed so-called "neutralizing" steering torque of a preferably clearly smaller amount |LM2| (with |LM2|<<|LM1|) is applied.

In order to, in this case, ensure neutrality of the steering wheel rotational speed at the end of the complete intervention (consisting of the steering recommendation and the countertorque, it is described to apply the torque of the steering recommendation that is greater in its amount for a shorter time period (Δt1) and to apply the countertorque directed against the steering recommendation that is lower in its amount for a (correspondingly) longer time period (Δt2). This longer time period (Δt2) is ideally a result of the demand that the integral of the effective steering torque should at least approximately assume the "zero" value over the total time period (Δtges=Δt1+Δt2). In this sense, the amount of the (mathematical) integral of the steering torque representing a steering recommendation over the duration of its effect may essentially be equal to the amount of the (mathematical) integral of the neutralizing countersteering torque over the duration of its effect.

It is explicitly pointed out that, for achieving the effect according to the invention, no complete (mathematical) equality of the amounts of the integrals of the steering torque representing a steering recommendation and of the neutralizing countersteering torque has to be shown. Rather, a rough conformity may be sufficient because the driver can easily compensate slight deviations also after the expiration of his reaction time. It should further be pointed out that the neutralizing countersteering torque should be applied as directly as possible following the steering torque representing the steering recommendation to the steering wheel, as illustrated in FIGS. 2a, 2b. However, no torque at all may definitely be applied for a short time period on the part of the driver assistance system between the steering torque (LM1) representing a steering recommendation and the neutralizing countersteering torque (LM2).

If the steering wheel is not tightly held or almost not tightly held by the driver, the measures described here lead, subsequent to a steering recommendation made by the assistance system, to a considerably lower effect of such an assistance intervention on the driving trajectory of the vehicle. After such an assistance intervention of the vehicle according to the invention, the orientation or alignment of the vehicle therefore corresponds at least essentially to the starting orientation before this intervention. Situations not expected by the driver can therefore be avoided. At the same time, when the steering wheel is held tightly, the perception of the steering indication as well as the reaction thereto by the driver are not significantly impaired because of the suggested measure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system of a non-track-bound vehicle having a steering wheel operable by a driver, the system comprising:
    a drive operatively configured to apply a steering torque to the steering wheel in order to provide a direction-oriented steering recommendation to the driver; and
    an electronic control unit operatively coupled to the drive and including a processor and associated memory, the control unit configured to operate the drive such that:
        the steering wheel is set, via a first torque, to a first steering wheel angle in a first direction of rotation and according to a first angular velocity, thereby providing the direction-oriented steering recommendation to the driver, and
        the steering wheel is set, via a second torque directed against the first torque, to a second steering wheel angle in a second direction of rotation opposite the first direction of rotation and according to a second angular velocity of smaller magnitude than the first angular velocity,
    wherein the steering wheel is set to the first steering wheel angle over a first time period and the steering wheel is set to the second steering wheel angle over a second time period greater than the first time period.

2. The driver assistance system according to claim 1, wherein the magnitude of the second steering wheel angle is essentially equal to the magnitude of the first steering wheel angle.

3. The driver assistance system according to claim 2, wherein the electronic control unit is further configured to operate the drive such that the steering wheel is set to a third steering wheel angle from the second steering wheel angle by which the vehicle is essentially returned to an orientation held before the direction-oriented steering recommendation was provided.

4. The driver assistance system according to claim 1, wherein the electronic control unit is further configured to operate the drive such that the steering wheel is set to a third steering wheel angle from the second steering wheel angle by which the vehicle is essentially returned to an orientation held before the direction-oriented steering recommendation was provided.

5. The driver assistance system according to claim 1, further comprising:
    a superimposing system configured to provide an additional steering angle in addition to a steering angle defined by the steering wheel, wherein
        when the direction-oriented steering recommendation is made, the superimposing system sets the additional steering angle against the first steering wheel angle,
        when the second steering wheel angle is being set, the superimposing system sets the additional steering angle against the second steering wheel angle, and
        the additional steering angle is set such that the vehicle is returned at least approximately to an orientation held before the direction-oriented steering recommendation was provided.

6. The driver assistance system according to claim 1, wherein rear wheels of the vehicle are steerable in addition to front wheels of the vehicle being steerable via the steering wheel, and
    wherein
        when the direction-oriented steering recommendation is made, a rear-wheel steering angle is set according to the first direction of rotation,
        when the second the steering wheel angle is being set, the rear-wheel steering angle is set according to the second direction of rotation, and/or
        the rear-wheel steering angle is set such that the vehicle is returned at least approximately to an orientation held before the direction-oriented steering recommendation was provided.

7. The driver assistance system according to claim 1, further comprising a one-sided braking system configured to impress a yaw moment on the vehicle and directed against the first and/or second steering wheel angle.

8. The driver assistance system according to claim 1, further comprising a one-sided braking system configured to impress a yaw moment on the vehicle such that the vehicle is returned at least approximately to an orientation held before the direction-oriented steering recommendation was provided.

9. The driver assistance system according to claim 1, wherein the drive comprises at least one of: an electric motor and a servomotor, and wherein the control unit is further configured to automatically operate the drive in accordance with the first and second steering wheel angles and the first and second angular velocities.

10. The driver assistance system according to claim 1, wherein the direction-oriented steering recommendation is made via a jerky application of the first steering torque to the steering wheel, and wherein subsequently, the second steering torque of a smaller magnitude and a correspondingly longer duration, directed against the first steering torque is applied to at least approximately neutralize the first steering torque.

11. The driver assistance system according to claim 10, wherein an integral amount of the first steering torque over its effective period is essentially equal to an integral amount of the second steering torque over its effective period.

12. The driver assistance system according to claim 1, wherein the drive comprises at least one of: an electric motor and a servomotor, and wherein the controller, in operating the drive to apply steering torque, accounts for friction effects in an associated steering system of the vehicle.

13. The driver assistance system according to claim 1, wherein the second steering wheel angle is set from the first steering wheel angle.

14. A method of operating a driver assistance system of a non-track-bound vehicle, the method comprising the acts of:
    making a direction-oriented steering recommendation to a driver of the vehicle by applying a first steering torque, via an electric motor, to a steering wheel operable by the driver, wherein
        by way of the applied first steering torque, the steering wheel is set to a first steering wheel angle in a first rotating direction and according to a first angular velocity,
        subsequently, by way of applying a second steering torque directed against the first steering torque, the steering wheel is set to a second steering wheel angle in a second rotating direction opposite the first rotating direction and according to a second angular velocity of a smaller magnitude than the first angular velocity, and
        wherein the steering wheel is set to the first steering wheel angle over a first time period and the steering wheel is set to the second steering wheel angle over a second time period greater than the first time period.

15. The method according to claim 14, wherein the magnitude of the second steering wheel angle is essentially equal to the magnitude of the first steering wheel angle.

16. The method according to claim 14, further comprising the acts of:
    setting the steering wheel to a third steering wheel angle from the second steering wheel angle by which the vehicle is essentially returned to an orientation held before the direction-oriented steering recommendation was made.

17. The method according to claim 16, further comprising the acts of:
    providing a steering angle for steerable wheels of the vehicle, the steering angle defined by the steering wheel,
    providing, via a superimposing system, an additional steering angle for the steerable wheels, wherein
        when the steering wheel is set to the first steering wheel angle, the additional steering angle is set against the first steering wheel angle,
        when the steering wheel is set to the second steering wheel angle, the additional steering angle is set against the second steering wheel angle, and
    the additional steering angle is set such that the vehicle is returned at least approximately to an orientation held before the direction-oriented steering recommendation was made.

18. The method according to claim 17, wherein rear wheels of the vehicle are at least slightly steerable, the method further comprising the acts of:
    steering rear wheels of the vehicle in accordance with the first rotating direction when the steering wheel is set to the first steering wheel angle,
    steering rear wheels of the vehicle in accordance with the second rotating direction when the steering wheel is set to the second steering wheel angle, and/or
    steering the rear wheels such that the vehicle is returned at least approximately to an orientation along a straight course of road held before the direction-oriented steering recommendation was made.

19. The method according to claim 18, wherein a yaw moment is impressible on the vehicle by one-sided braking system, the method further comprising the acts of:
    impressing the yaw moment such that the vehicle is returned at least approximately to an orientation held before the direction-oriented steering recommendation was made.

* * * * *